No. 839,634. PATENTED DEC. 25, 1906.
E. O. PEASE.
VEHICLE TIRE.
APPLICATION FILED FEB. 20, 1906.
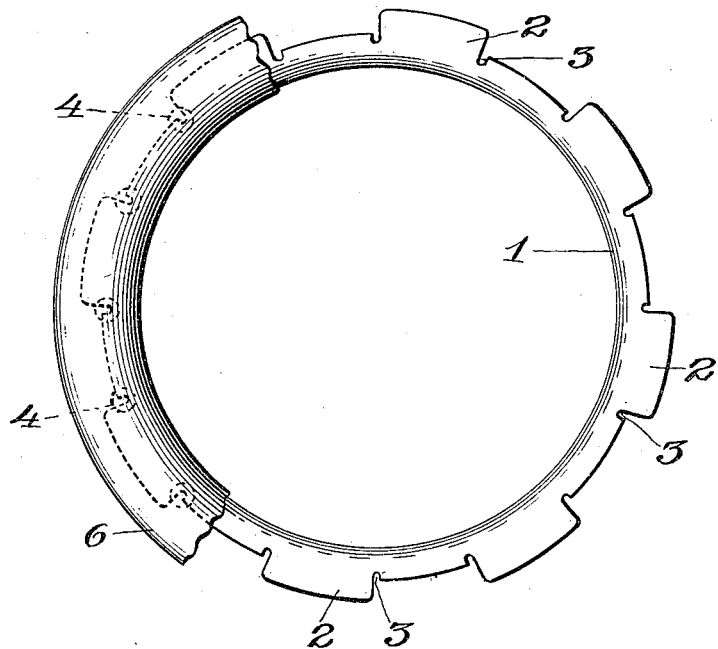
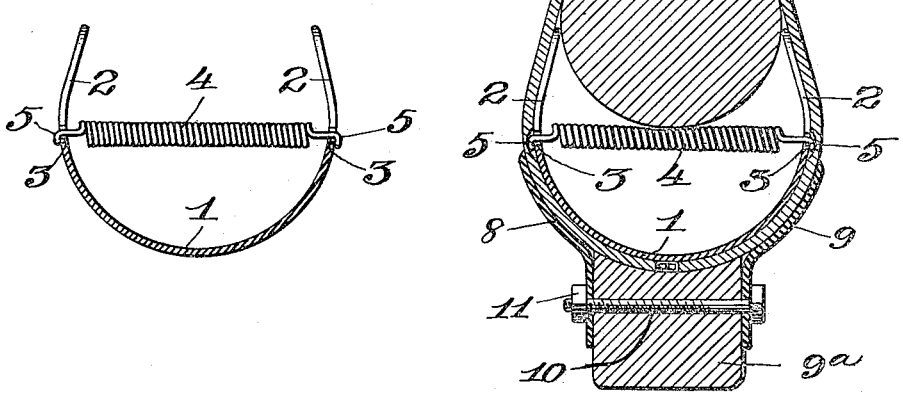
Witnesses
Chas. L. Wolf.
Albert B. Blackwood.
Inventor
Edwin O. Pease
By his Attorney
Charles A. Stephens

UNITED STATES PATENT OFFICE.

EDWIN O. PEASE, OF BANGOR, MAINE.

VEHICLE-TIRE.

No. 839,634.        Specification of Letters Patent.        Patented Dec. 25, 1906.

Application filed February 20, 1906. Serial No. 302,110.

*To all whom it may concern:*

Be it known that I, EDWIN O. PEASE, of Bangor, county of Penobscot, State of Maine, have invented certain new and useful Improvements in Vehicle-Tires, of which the following is a specification, reference being had to the accompanying drawings.

My invention relates to improvements in vehicle-tires.

It has for its object to provide a simple, inexpensive, and durable tire adapted to be applied upon the wheel of any class of vehicles and embodying a concaved rim spanned by a series of circularly-arranged springs having their ends detachably connected thereto, a flexible elastic ring encircling said springs and being yieldably supported thereon and held and guided by said rim, and a flexible covering inclosing all of said parts.

In the drawings, Figure 1 is a fragmentary detail side view of my tire; Fig. 2, a transverse sectional view of the rim, and Fig. 3 a transverse sectional view of the entire tire secured upon the felly of a wheel.

In all the figures of the drawings illustrating my invention like reference characters designate corresponding parts.

Referring to the drawings, the rim 1 of my tire which may be made of any suitable material, is concaved and its edges provided with spaced projections 2 and notches 3 adjacent said projections, the projections and notches of the edges registering. A series of circularly-arranged spiral springs 4 extend across the rim 1, and their ends are provided with hooks 5, which engage the notches 3 in said rim and hold said springs removably in place. Upon the spiral springs is yieldably supported a solid flexible elastic ring 5ª, said ring being held in place thereon and guided in its movement by the projections 2 of the rim bearing against it. A flexible shield or covering 6, of suitable material, incloses all the parts of the tire, excluding foreign matter therefrom—such, for instance, as dust, mud, or water—and thereby preserves said parts in perfect condition.

The tire embodying the parts above referred to is held in place upon the felly 9ª of a wheel by means of rings 8 and 9, which bear against the covering 6 and the felly on each side and are secured to the felly 9ª by bolts 10, having nuts 11 thereon.

From the foregoing it will be understood that when weight is placed upon the vehicle or the wheels come into contact with an obstruction the flexible elastic ring 5 will be forced inwardly between the projections 2 against the action of the supporting-springs 4 and when relieved from the weight or the effect of the shock the springs will act immediately to force it outwardly again, thus yieldably supporting it within the rim 1 and forming an easy-riding tire which is not effected by puncture, and therefore less likely to get out of order than a pneumatic tire.

I do not wish to be understood as limiting myself to the precise details and arrangements of parts shown and described, but reserve the right to all modifications within the scope of my invention.

Having now described my invention, what I claim as new, and desire to secure by Letters Patent, is—

1. In a vehicle-tire, a concaved rim having spaced projections on its edges and springs spanning said rim and having their ends secured to its edges, substantially as described.

2. In a vehicle-tire, a concaved rim having spaced projections on its edges, notches in its edges between said projections and springs spanning said rim and their ends engaging said notches, substantially as described.

3. In a vehicle-tire, a concaved rim having spaced projections on its edges, notches in its edges between said projections and spiral springs spanning said rim and having hooked ends engaging said notches, substantially as described.

4. In a vehicle-tire, a concaved rim having spaced projections on its edges, springs spanning said rim and having their ends secured to its edges and a flexible elastic ring yieldably supported on said springs, substantially as described.

5. In a vehicle-tire, a concaved rim having spaced projections on its edges, springs spanning said rim and having their ends secured to its edges, a flexible elastic ring yieldably supported on said springs, and an inclosing covering for all of said parts, substantially as described.

6. In a vehicle-tire, a concaved rim having spaced projections, notches in its edges between said projections, springs spanning said rim and their ends engaging said notches and a flexible elastic ring yieldably supported on said springs, substantially as described.

7. In a vehicle-tire, a concaved rim having spaced projections, notches in its edges between said projections, springs spanning said rim and their ends engaging said notches, a flexible elastic ring yieldably supported on said springs, and an inclosing covering for all of said parts, substantially as described.

In testimony of all which I have hereunto subscribed my name.

EDWIN O. PEASE.

Witnesses:
MARCIA A. TAYLOR,
ELLA M. TAYLOR.